411-333 AU 355 EX
XR RE 20,542 71/1H
X455 7D (2)

Oct. 26, 1937. H. I. DYER Re. 20,542
Orig. 2,035,055

LOCKING DEVICE

Original Filed July 5, 1935 2 Sheets-Sheet 1

INVENTOR
Harold I. Dyer
BY
Harness, Dickey & Pierce
ATTORNEYS.

21

Oct. 26, 1937. H. I. DYER Re. 20,542

LOCKING DEVICE

Original Filed July 5, 1935 2 Sheets-Sheet 2

INVENTOR
Harold I. Dyer.
BY
Harness, Dickey & Pierce.
ATTORNEYS.

21

Reissued Oct. 26, 1937

Re. 20,542

UNITED STATES PATENT OFFICE 20,542

LOCKING DEVICE

Harold I. Dyer, Battle Creek, Mich., assignor, by mesne assignments, to Eaton Manufacturing Company, Cleveland, Ohio, a corporation of Ohio Original No. 2,035,055, dated March 24, 1936, Serial No. 29,981, July 5, 1935. Application for reissue March 22, 1937, Serial No. 132,349

10 Claims. (Cl. 151—21)

This invention relates to locking devices for holding screw threaded parts in any desired predetermined position without the use of locking nuts or any other auxiliary device to hold the threaded parts in a desired predetermined adjustment. When locking nuts are employed, to hold threaded parts in predetermined adjustment; such as, in valve mechanism for internal combustion engines, it is necessary to use three wrenches on certain types of mechanisms. Inaccurate adjustments are often made due to the troublesome handling of so many tools and the movement of the thread parts when the lock nut is tightened, because of the tendency of a threaded part to move in the direction of the lock nut.

The present invention is adaptable for any use wherein it is necessary to lock threaded parts in any predetermined position, and is particularly adaptable to valve mechanisms, brake rods, slack adjusters, turnbuckles, etc., as there is no locking nut or any other auxiliary device to hold the threaded parts in predetermined position. The threaded parts are so designed that the internal or external threads thereof are in contact at the side of the thread where the pressure in operation will force the threads together.

The invention further consists in the novel manner of constructing the parts and the arrangement of the threads thereof, so that when the parts are joined together, a frictional locking engagement is provided with the threads of the members sufficient to hold the members together in their adjusted relation regardless of the amount of shock or vibration transmitted thereto.

The invention consists of certain novel features of construction and combination of parts which will be hereinafter described and set forth in the appended claims.

Figure 4:
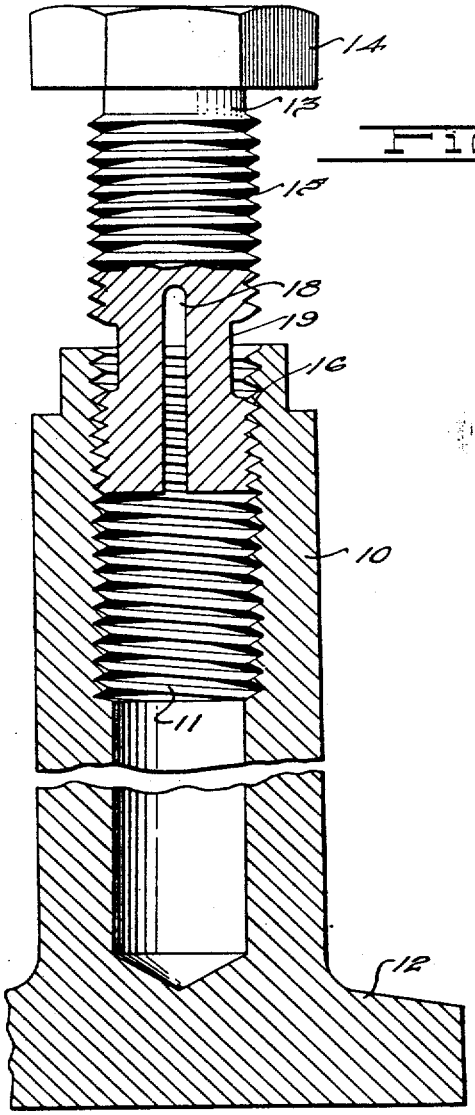
Figure 5:
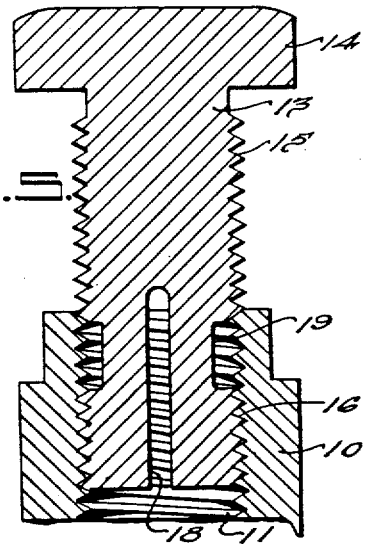
Figure 6:
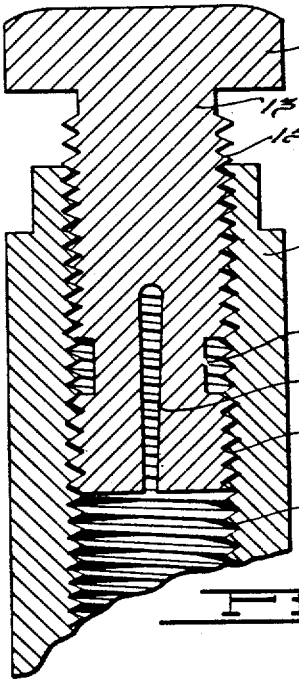

Figs. 4, 5, and 6 are views in vertical section illustrating the manner in which the members are assembled.

In the drawings, the invention is disclosed in connection with a valve tappet, but it is not the intent to be limited to this particular disclosure, as it is evident that the invention is capable of application to many other uses where "fine or nice" adjustments must be procured, and the parts subjected to vibrations and shocks which would ordinarily cause the parts to work loose or become separated and defeat the very purpose for which the adjustment has been made.

The member 10 is preferably hollow or tubular, and provided with internal screw threads 11. One end of the member is provided with an enlarged head 12 against which a cam operates when the device is employed for a valve tappet. The other or male member 13 consists of a stem provided with a head 14 which may engage a valve stem or rocker arm (not shown).

The member 13 is provided with two threaded sections 15 and 16, the threads of which are of the same pitch, and adapted to have a screw-threaded fit with the threads 11 of the member 10. The threads of section 15 of the member 13 and the threads of section 16 are interrupted by a mismatched lead, that is, the rib of the threads of sections 15 and 16 are not a true continuation or in alinement with respect to each other. The dotted line 17 of Fig. 2 indicates a continuation of the thread of section 15, throughout the length of stem 13 and onto the lower section 16, while the full lines indicate the offset relation of the thread of section 16 with respect to the threads of section 15.

Figure 2:
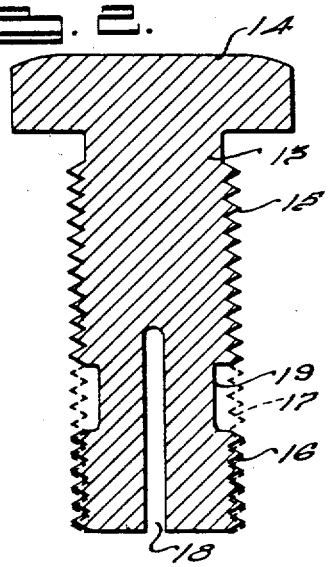
Fig. 2 is a vertical section through one of the members.
Figure 3:
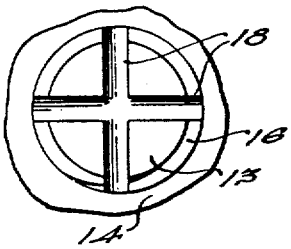
Fig. 3 is a bottom plan view thereof.

It is to be noted that the member 13, as shown in Fig. 2, discloses the threaded sections 15 and 16 as being separated by a space 19 with each section in itself having the same or standard pitch. Assuming, as indicated by the dotted line 17, that the threads of the section 15 continue throughout the length of the member 13 and a measurement was taken of the pitch between the threads of the section 15 with respect to the pitch of the threads of the section 16, the pitch between the threads of the sections 15 and 16 would be shorter than the pitch of either of the threads of section 15 or 16. The shortened pitch or lead between the sections 15 and 16 may be changed to any amount sufficient to give the required thrust to the thread. This thrust causes section 16 to pull downwardly on section 15 as they are screwed into the member 10, causing section 15 to be frictionally held in any predetermined position. The threads 15 of the member 13 are therefore axially displaced with respect to the thread 16, thereby producing an interrupted lead between the two sections 15 and 16.

The lower portion of the member 13 is bifurcated as at 18, so that the end is bifurcated in two directions with the bifurcations intersecting. This bifurcation 18 preferably extends a short distance into the member 13 beyond the lower portion of the upper threaded section 15. Also

Figure 1:
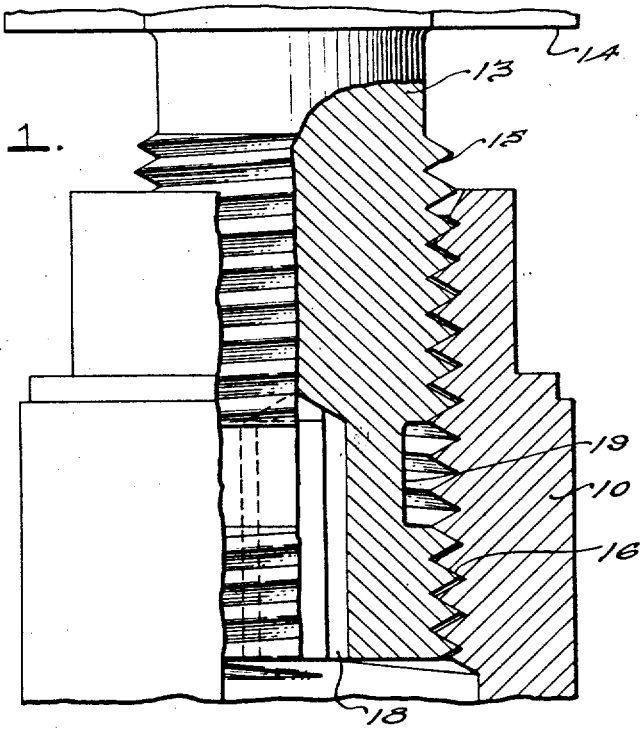
Fig. 1 is a view in elevation and partly in section showing the invention with the parts in locked position.

BEST AVAILABLE COPY in practice it has been found feasible to produce an annular recess 19 between the two threaded sections 15 and 16, which together with the bifurcations 18 provide the desired resiliency to the lower end of this member 13 to permit of the two threaded sections being attached to the tubular member 10. In Fig. 1 the lower end of the member 13 is shown cored with the walls bifurcated or slotted at 18.

As illustrated in Figs. 4, 5, and 6 which show the method of assembly of the two members, the lower portion 16 of the male member 13 is screwed into the tubular member 10. Then, as the threaded portion 15 takes into the threads 11 of the tubular member 10, as indicated in Fig. 5, the lower section 16 will be caused to contract, which is permissible due to its bifurcation, thereby permitting the threads of the section 15 to engage and screw into the internal threads 11 of the tubular member 10. Due to the lack of continuance between the ribs of the threads of the sections 15 and 16, the threads of the section 16 will impinge against the upper face of the threads 11 of the tubular member 10, while the threads of section 15 will impinge against the lower face of the threads 11 of the tubular member 10, as shown in Fig. 1. This engagement of the threads of the tubular member with the threads of the two sections of the male member causes a locking of the male member in the tubular member, as the threads of the lower member 16 are exerting a tensional pull downward on the threads of the section 15, and thereby frictionally locking the member 13 and the member 10 to the desired adjustment.

The amount of offset or interruption of the threads of the sections 15 and 16 is governed by the degree of thrust and tension deemed necessary to be imparted to the threads in frictionally locking the two members together. The slots or bifurcations 18 and the reduced portion 19 permit the lower end of the stem or member 13 to contract or yield sufficiently to compensate for a greater or lesser thrust on the threads as may be caused by too tight or loose a fit between the members.

Referring to Fig. 1, the adjusting screw or member 13 is shown in locked position, the locking of the screw 13 being accomplished by shortening the interrupted lead between the threaded sections 15 and 16. When the threaded member 13 is fitted to the mating member 10, the threads on section 16 thereof fit somewhat loosely, and as the threads of section 15 start to enter the threaded mating member 10, as shown in Fig. 5, the lead of the screw being slightly shorter between the threaded sections 15 and 16, pulls the threaded section 15 downward and holds the threaded section 15 in tension. The slots 18 permit the section 16 to yield sufficiently as the section 15 is screwed into the member 10, as otherwise the members 10 and 13 would lock, or prevent the members from being screwed together without stripping the threads of one of the members.

In the manufacture of the threaded member 13, a good grade of material that retains its flexibility and yields to compensate for the interrupted thread lead is desirable, as the yielding of the section 16, which is provided for by slotting the end of the screw or member 13, is for the purpose of providing the proper tensioning on the threaded section 15, as shown on the enlarged view of Fig. 1. Any desired amount of locking power can be obtained by controlling the amount the interrupted or mismatched lead is shortened between the sections 15 and 16 as shown by the botted line 17, as when a material is selected that will retain the resilient yielding portion, as shown in section 16 in Fig. 1, the holding power to retain the threaded members in fixed position is permanently retained.

While it has been shown that the member 13 is provided with the two sets of threads 15 and 16, and which threads are interrupted, this same arrangement of threads could be applied to the member 10, and the member 13 provided with threads having the ribs thereof in uniform relation throughout the length of the member 13.

Furthermore, the threads of the sections 15 and 16 could be so arranged that the threads 16 would exert a push on the threads 15 causing them to engage the upper face of the thread of the member 10, and the threads of the section 16 to engage the lower face of the threads, or just the opposite from the disclosure as shown in Fig. 1.

It will be understood that the foregoing description only describes one use of the invention, and the same locking method may be applied to many uses where it is desired to retain threaded parts locked in predetermined position, and that other threaded devices may employ the invention without departing from the spirit and scope thereof.

What I claim is:

1. A self-locking screw having a pair of axially spaced threaded sections connected by an unthreaded portion, the lead of the thread of one of said sections being offset axially from the lead of the thread of the other section, said screw having an axially extending slot therein extending throughout the length of one of said threaded sections dividing the same into a pair of portions.

2. A self-locking screw having a pair of axially spaced, integrally connected, axially aligned, threaded sections connected by an unthreaded portion, the lead of the thread of one of said sections being offset axially from the lead of the thread of the other of said sections.

3. A self-locking screw having a pair of coaxial, integrally connected, axially spaced threaded sections connected by an unthreaded portion, the lead of the thread of one of said sections being axially offset from the lead of the thread of the other section, said screw having an axially extending slot therein extending throughout the length of one of said threaded sections.

4. A self-locking screw having a substantially cylindrical externally threaded shank, a pair of projections integrally formed on said shank and axially extending therefrom, portions of the surfaces of said projections having threads thereon of substantially the same pitch diameter as the threads on said shank but having the lead thereof offset axially from the lead of the thread on said shank, the threads on said portions being axially spaced from the threads on said shank.

5. A self-locking screw having a substantially cylindrical externally threaded shank and a bifurcated projection extending axially therefrom, the portion of said projection adjacent said shank being of smaller diameter than said shank, the outer end portion of said projection having substantially the same diameter as said shank and being provided with a thread of substantially the same pitch diameter as the thread on said shank, the lead of the thread of said projection being

21 axially offset with respect to the lead on said shank.

6. A self-locking connection comprising an internally threaded member and an externally threaded screw adapted to be received therein, said screw having a pair of integrally connected axially spaced threaded sections interconnected by means of a portion of reduced diameter, said screw having an axially extending slot formed therein extending from one of the ends of said screw throughout the length of one of said threaded sections and substantially throughout the length of said reduced diameter portion, the lead of the thread of one of said sections being axially offset with respect to the lead of the thread of the other of said sections whereby the threads on said slotted threaded section may be displaced radially inwardly as said screw is threaded into said member.

7. A self locking screw comprising a shank portion including a pair of axially spaced, integrally connected threaded sections, the lead of the thread of one of said sections being offset axially with respect to the lead of the thread of the other of said sections, said screw having an axially extending slot extending throughout one of said sections, the portion of said screw shank interconnecting said threaded sections being of reduced diameter.

8. A self locking screw comprising a shank portion including a pair of axially spaced, integrally connected threaded sections, the lead of the thread of one of said sections being offset axially with respect to the lead of the thread of the other of said sections, the portion of said screw shank interconnecting said threaded sections being of substantial length and having a diameter substantially less than the pitch diameter of said threaded sections, said screw shank having a diametrically disposed slot formed therein extending axially throughout the length of one of said threaded sections.

9. A self locking screw comprising a shank portion having a pair of coaxially arranged axially spaced, integrally connected threaded sections, said threads of said sections being of identical pitch and identical pitch diameter, the lead of the thread of one of said sections being axially offset with respect to the lead of the thread of the other of said sections, said screw shank having a diametrically disposed axially extending slot extending from one axial end of said screw throughout one of said threaded sections and throughout the portion of said screw shank interconnecting said threaded sections.

10. A self locking screw comprising a shank portion including a pair of axially spaced, integrally connected threaded sections, the lead of the thread of one of said sections being offset axially with respect to the lead of the thread of the other of said sections, the portion of said screw shank interconnecting said threaded sections being of substantial length and having a diameter substantially less than the diameter of said threaded sections, said screw shank having a diametrically disposed axially extending slot formed therein extending from one axial end of said screw throughout one of said threaded sections and throughout the portion interconnecting said threaded sections, thereby turning one of said threaded sections into two separate portions adapted for limited resilient radial movement with respect to each other.

HAROLD I. DYER.